(12) United States Patent
Takemoto et al.

(10) Patent No.: US 7,557,299 B2
(45) Date of Patent: Jul. 7, 2009

(54) POWER SUPPLY DEVICE

(75) Inventors: Hisashi Takemoto, Shizuoka (JP); Naoto Kogure, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/003,713

(22) Filed: Dec. 31, 2007

(65) Prior Publication Data
US 2008/0169127 A1     Jul. 17, 2008

(30) Foreign Application Priority Data
Jan. 17, 2007    (JP) .............................. 2007-007703

(51) Int. Cl.
*H01B 7/06* (2006.01)
(52) U.S. Cl. .................... 174/72 A; 174/68.1; 174/135; 174/72 C; 439/501
(58) Field of Classification Search ............... 174/72 A, 174/72 C, 68.1, 68.3, 69, 97–99 R, 135, 70 R, 174/70 C; 439/501, 502, 162; 361/826; 248/629; 296/149, 152; 138/111, 157, 158, 138/166, 168
See application file for complete search history.

(56) References Cited
U.S. PATENT DOCUMENTS
6,791,032 B2 * 9/2004 Doshita et al. ............... 174/135

| | | | |
|---|---|---|---|
| 7,053,304 B2 * | 5/2006 | Ojima et al. | 174/72 A |
| 7,202,415 B2 * | 4/2007 | Fujita | 174/72 A |
| 7,341,478 B2 * | 3/2008 | Tsubaki et al. | 439/501 |
| 7,375,281 B2 * | 5/2008 | Kogure et al. | 174/72 A |
| 2002/0005014 A1 | 1/2002 | Doshita et al. | |
| 2006/0056165 A1 | 3/2006 | Tsunoda et al. | |

FOREIGN PATENT DOCUMENTS
JP    2001-354085    12/2001

* cited by examiner

*Primary Examiner*—Dhiru R Patel
(74) *Attorney, Agent, or Firm*—Edwards Angell Palmer & Dodge LLP

(57) ABSTRACT

The object of the invention is to provide a power supply device capable of reducing the protector size, which includes a protector for receiving a wiring harness and extending the floating wiring harness through an elongated opening therein, a harness winding section free to bend the wiring harness to regulate a minimum radius of curvature of the wiring harness while holding its freedom of movement within the protector, and an elastic member for energizing the harness winding section to lead the wiring harness into the protector. In this power supply device, the harness winding section can be moved in one direction against the energized elastic member in an end area of the elongated opening, and the harness winding section energized by the elastic member can be moved in the other direction in the center area of the elongated opening. Further, the elastic member can be received inside the harness winding section.

2 Claims, 5 Drawing Sheets

POWER SUPPLY DEVICE

CROSS-REFERENCE TO RELATED APPLICATIONS

The present Application claims priority to Japanese Patent Application No. 2007-007703 filed Jan. 17, 2007, the entire disclosure of which, including the specification and drawings, is expressly incorporated herein by reference.

BACKGROUND OF THE INVENTION (1) Field of the Invention

The present invention relates to a power supply device where a wiring harness is foldably arranged along a harness winding section within a protector. The power supply device can be employed for example in a sliding door of a vehicle.

(2) Description of the Related Art

An exemplary conventional power supply device is shown in FIGS. 11 and 12. For example, the conventional power supply device is disclosed in Japanese Publication of Patent Application No. 2001-354085. In detail, refer to FIGS. 4, 7, and 13 of the Japanese publication.

In FIGS. 11 and 12, the power supply device 50 is positioned on the sliding door 41 of a vehicle, and is shown to include a protector 42 formed of synthetic resin material and configured to receive a wiring harness 43, and a flat spring 44 capable of upwardly energizing the wiring harness 43 within the protector 42.

The protector 42 is comprised of a protective base (also designated as a reference numeral 42) and a protective cover (now shown). The protective cover and the protective base respectively have an opposing substrate 51 and a peripheral wall 52. The protective cover is engaged with the protective base, which is secured to the panel of the sliding door 41 by means of a bolt 56, a crimping means and so on. A circular harness winding section 54 for controlling the radius of curvature of the wiring harness 43 and the flat spring 44 are unitarily formed on the inner surface of the substrate 51.

The lower end of the flat spring 44 is secured to the wiring harness 43 as well as a harness fixing section 55 disposed in the protector 42. A cap member formed of synthetic resin and positioned in the front end of the flat spring 44 supports the wiring harness 43 in a stable manner.

During the wiring harness 43, there are provided a plurality of insulated electrical wires 43a, which are covered with a corrugate tube 43b formed of synthetic resin. In this configuration, the front end of the corrugate tube 43b is secured to the harness fixing section 55 of the protector 42 by means of a fixing member such as tapes. The corrugate tube 43b has a good flexibility, which is because it has alternate circumferential convex and concave portions in its longitudinal direction.

The electrical wires 43a of the wiring harness 43 extend through the front portion of the protector 42, and then are connected to the accessory of the sliding door side. The corrugate tube 43b of the wiring harness 43 extends through an lower elongated opening 45 of the protector 42, then a space 46 (refer to FIG. 7), and then a fixture 53 of the wiring harness 43 side (also designated as a harness fixing section), which is positioned in a vehicle body 47, while holding its all freedom of movement. Finally, the corrugated tube 43b is connected to the wiring harness (now shown) of the vehicle body side by means of a connector. The protector 42 is covered with a door trim piece (now shown) formed with synthetic resin, and therefore is invisible. The wiring harness 43 extends through the opening of the door trim piece, and then the vehicle body side.

FIGS. 11 and 12 respectively illustrate the sliding door 41 in its fully closed position and fully open position. In its fully closed position, the wiring harness 43 is pulled in a rearward direction while being supported by the harness fixture 53 of the wiring harness 43. On the other hand, in its fully open position, the wiring harness 43 is pulled in a forward direction, and therefore is bent along the circumferential plane of the harness winding section 54, allowing for controlling the minimum radius of curvature of both the flat spring 44 and the wiring harness 43. As a result, both the flat spring 44 and the wiring harness 43 are prevented from undergoing excessive plastic deformation.

Under the condition where the sliding door 41 is partially open, while the wiring harness 43 is inclined to unroll in a downward direction, it is energized in an upward direction by use of the flat spring 44 and therefore the extra length of the wiring harness (i.e. the remaining length of the wiring harness) can be received. As a result, the extra length of the wiring harness 43 can prevented from being jammed. Immediately after opening, the sliding door 41 moves along a guide rail (now shown) while departing from the vehicle body 47 side.

Meanwhile, in the case of using afore-mentioned device for supplying electric power to a vehicle sliding door, in particular, a sliding door for a light car or a small sized car, due to its small stroke needed for its opening or closing, the harness winding section 54 should have a relatively large diameter. This is for suppressing the bending or folding of both the wiring harness 43 and the flat spring 44. In addition, the protector 42 has a tendency to gain more height in order to fully receive the extra length of the wiring harness 43. Moreover, the harness winding section 54 requires a relatively large amount of space within the protector 42, thereby increasing the protector 42 in size. Also, a relatively expensive flat spring and a cap member positioned in the front end of the flat spring are required, thereby increasing the prepare cost of the power supply device.

To solve the afore-mentioned drawbacks, the present invention is intended to provide a power supply device capable of reducing the protector size, the number of parts to be used therein, and the prepare cost thereof.

SUMMARY OF THE INVENTION

According to one aspect of the present invention, there is provided a power supply device, which includes a protector for receiving a wiring harness and extending the floating wiring harness through an elongated opening therein, a harness winding section free to bend the wiring harness to regulate a minimum radius of curvature of the wiring harness while holding its freedom of movement within the protector, and an elastic member for energizing the harness winding section to lead the wiring harness into the protector.

In this power supply device, in an end area of the elongated opening, the harness winding section can be moved in one direction against the energized elastic member, and in the center area of the elongated opening, the harness winding section energized by the elastic member can be moved in the other direction.

Further, in this power supply device, the elastic member can be received inside the harness winding section.

Figure 1:
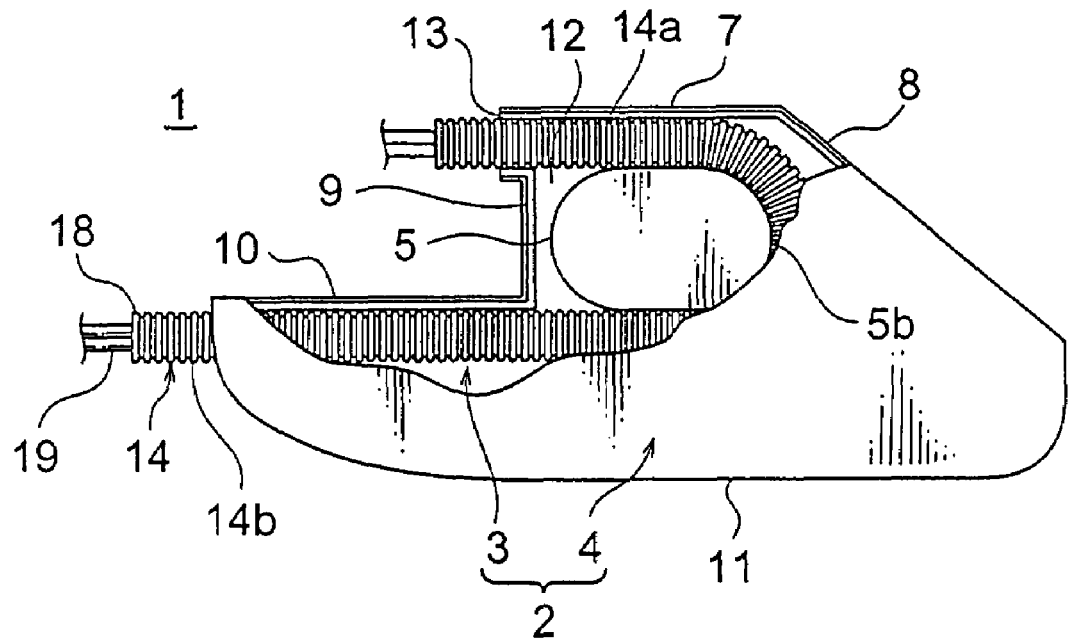
FIG. 1 is a front view of a power supply device in accordance with the first embodiment of the present invention, with partially omitted.

The foregoing summary, as well as the following detailed description of certain embodiments of the present invention, will be better understood when read in conjunction with the appended FIGS. 1 to 12. For the purpose of illustrating the invention, there is shown in the drawings, certain embodiments. It should be understood, however, that the present invention is by no means limited by the appended drawings.

DESCRIPTION OF THE PREFERRED EMBODIMENTS

FIGS. 1 to 5 pertain to a power supply device in accordance with the first embodiment of the present invention.

As shown in FIG. 1, the power supply device 1 is vertically mounted to a vehicle sliding door (not shown), and is shown to include a protector 2 (i.e. a covering) formed of synthetic resin, a harness winding section 5 slidably moving across the protector 2 and having elliptical shape, and a coil spring 6 (i.e. an elastic member) for energizing the harness winding section 5 toward the front of the vehicle (i.e. the right hand side in FIG. 1).

The protector 2 is shown to include a protective case 3 having a relatively lower height and a protective cover 4. These protective case 3 and protective cover 4 are fixed to each other by an engaging member (now shown). The top wall 7 of the protector 2 is arranged in a flat configuration, and is connected to a relatively long inclined wall 8 (front side), and also to a relatively short vertical wall 9 (rear side), which is, in turn, connected to a horizontal wall 10. The inclined wall 8 and the horizontal wall 10 are connected to an opening 11 though which an oblong wiring harness extends. Each of peripheral walls 7~10 extends perpendicularly to a substrate 12.

A relatively narrow opening 13 through which a wiring harness extends is provided on top of the vertical wall 9. The upper portion 14a of the wiring harness 14 extends along the top wall 7 and is leaded through the opening 13. The upper portion 14a is fixed to the protector 2 in the vicinity of the opening 13 by means of any fixing member such as belts or tapes, and then is connected to the accessory of a vehicle sliding door side (not shown).

Further, a lower portion 14b of the wiring harness 14 extends from an opening 11, and is leaded in the vehicle body side (not shown) in a manner that the lower portion 14b can float in its longitudinal direction. The lower portion 14b is connected to the harness fixing portion (not shown) in the vicinity of a foot board of the vehicle body, and is in turn connected to the wiring harness (not shown) of the vehicle body side (i.e. electrical power side) via the harness fixing portion. It is desired to form a curved harness guide surface along the lower opening 11 in the lower end portion of the protective cover 4.

The shape of the protector 2 is not limited to the shape as illustrated in FIG. 1. For example, both the vertical wall 9 and the horizontal wall 10 may constitute an inclined wall, and therefore may be in a symmetrical relationship with the inclined wall 8. Furthermore, it is also possible to form the opening 13, which the upper wiring harness extends through, in the front area and/or in the center of the top wall 7.

Figure 2:
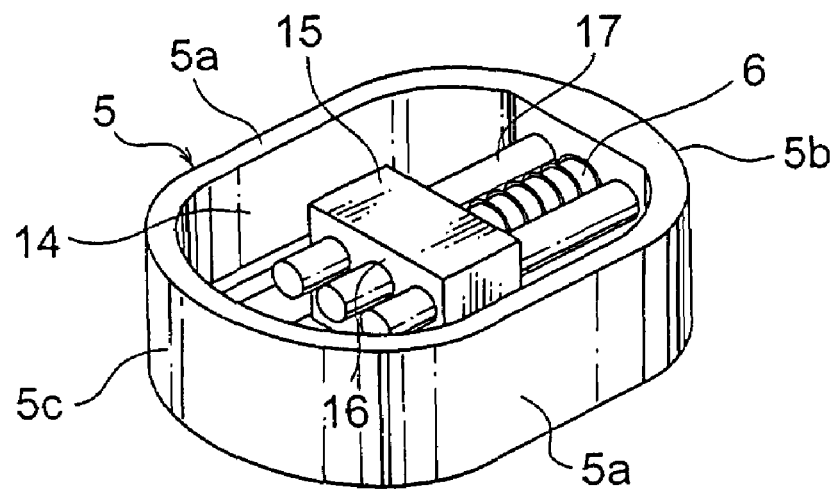
FIG. 2 is a front view of a harness winding section of the power supply device of FIG. 1.

The harness winding section 5 is longitudinally-slidably arranged between the protective base 3 and the protective cover 4. As shown in FIG. 2, the harness winding section 5 is mainly constituted by an elliptical wall, which includes a linear portions 5a positioned in the center thereof, and semi-circular portions 5b and 5c respectively positioned in the front and rear sides and connected to the linear portions 5a.

Within the inner space 14 of the harness winding section 5, a guide block 15 projects from the vertical substrate 12 of the protective base 3, as shown in FIG. 1. The guide block 15 has three apertures 16, which are substantially equally spaced from and parallel to one another. In this construction, three slide pins 17 pass though the three horizontal apertures 16. The end portion of the slide pin 17 is fixed to the inner surface of the front wall 5b of the harness winding section 5. The coil spring 6 is formed between the inner surface of the front wall 5b of the harness winding section 5 and the front side of the guide block 15. The harness winding section 5 is slidably connected to the protective base 4 through the sliding pin 17 and the guide block 15.

The guide block 15 is fixed to the protective base 3. The harness winding section 5 and the slide pin 17 are unitarily energized in a forward direction by means of the force of the coil spring 6. When the coil spring 6 reaches its maximum extended length, the harness winding section 5 moves forward. In this context, the terms "forward" and "rearward" are determined on the basis of the criterion of a vehicle. For example, the forward direction is defined by a direction toward the front side of the vehicle.

Further, it is possible to extrapolate the respective coil springs 6 into the top and bottom slide pins out of these three slide pins 17. It is also possible to employ two slide pins 17. The guide block 15 may be formed in not the protective base 3 but the protective cover 4, and thus the harness winding section 5 may be slidably connected to the protective cover 4 through the guide block 15 and the slide pin 17. Moreover, replacing the afore-mentioned compressed coil spring 6, other coil springs which are well known to one skilled in the art, or other elastic material such as rubber may be also employed.

As shown in FIG. 1, the synthetic resin-made corrugate tube 18 of the wiring harness 14 is arranged along the semi-elliptical circumferential wall (also designated as the numeral 5b) of the harness winding section 5, with bent in U-shape. The upper portion 14a and the lower portion 14b of the wiring harness 14 are arranged in parallel with each other. The lower portion 14b extends along the horizontal wall 10 of the protector 2 and also extends rearward through the rear end of the opening 11.

The wiring harness 14 is shown to include the corrugate tube 18 and a plurality of the insulated electrical wires 19 passing through the corrugate tube 18. Replacing the corrugate tube 18 as the wiring harness, a plurality of the electrical wires 19 may be bound by means of tapes, belt and so on. The corrugate tube can be substituted by protective tubes such as mesh tubes.

Figure 3:
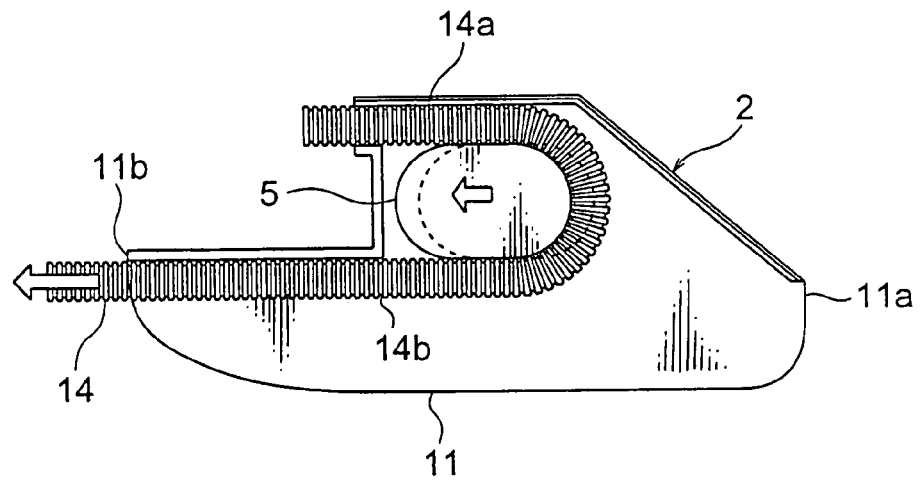
FIG. 3 is a front view of the power supply device of FIG. 1, with a sliding door fully closed.
Figure 4:
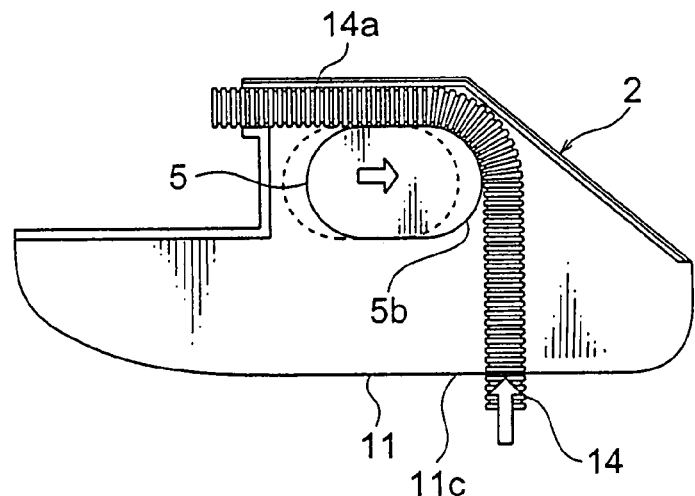
FIG. 4 is a front view of the power supply device of FIG. 1, with the sliding door partially open.
Figure 5:
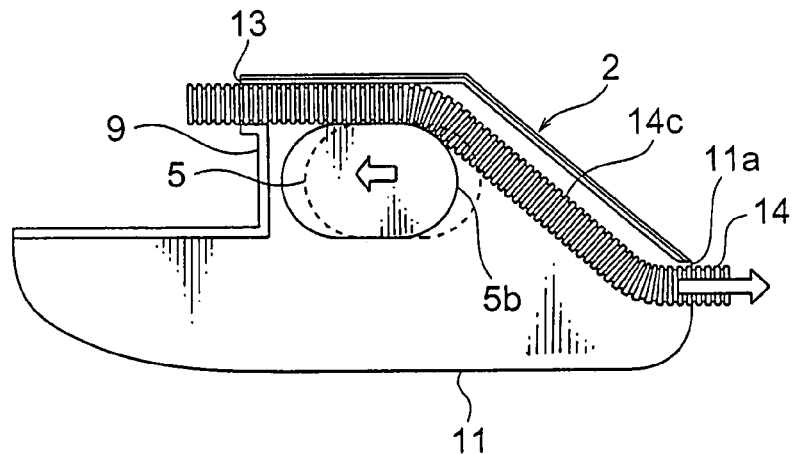
FIG. 5 is a front view of the power supply device of FIG. 1, with the sliding door fully open.

FIG. 3 also shows the power supply device with a sliding door fully closed. FIGS. 3 to 5 show the inside of the protector, with the protective cover 4 omitted.

As shown in FIG. 3, in a case where the sliding door is closed (i.e. when the sliding door is slided together with the protector 2 and thus closed), the upper portion 14a of the wiring harness 14 is fixed to the protector 2 in the area of the opening 13. In this case, while the lower portion 14b of the wiring harness 14 is drawn from the rear end 11b of the opening 11 toward the vehicle body side, as indicated by the arrow in FIG. 3, the harness winding section 5 is withdrawn as indicated by the arrow (i.e. from the position depicted by chain line to the position depicted by real line) against the force of the energized spring 6. Therefore, due to this energization force of the spring 6 exerted oppositely to the direction as indicated by the arrow, the wiring harness 14 can successfully maintain its approximate "U" shape.

In a case where the sliding door moves rearward together with the protector 2 from a closed position as shown in FIG. 3 to an open position over a vehicle opening, the lower portion 14 of the wiring harness 14 keeps floating toward the front side of the vehicle along the lower opening 11. In the case of the sliding door being partially open as shown in FIG. 4, the wiring harness 14 is inclined to unroll in the position of 11c and then to hang down in the space between the protector 2 and the vehicle body. However, since the harness winding section 5 is moved forward by the spring 6, as indicated by the arrow in FIG. 4, the wiring harness 14 is lifted upward along the curved surface 5b of the harness winding section 5, and then is leaded into the protector 2, thus allowing the extra length of the wiring harness 14 to be received in the protector 2.

In a case where the sliding door moves rearward together with the protector 2 from a partially open position as shown in FIG. 4, the wiring harness 14 keeps floating toward the front side of the vehicle along the lower opening 11. In the case of the sliding door being fully open, the wiring harness 14 is drawn from the front end portion 11a of the opening 11 toward the vehicle body side, as indicated by the arrow. The harness winding section 5 is pressed against the inclined section 14c of the wiring harness 14, and therefore backs to its original position against the energized spring. In other words, the harness winding section 5 moves in a direction as indicated by the arrow (i.e. from the position designated by chain line to the position designated by continuous line). The inclined section 14c of the wiring harness 14 is energized in the area of the curved surface 5b of the front end of the harness winding section 5, thus maintaining its high tension.

In the case of the sliding door being fully open, the length of the wiring harness 14 between the protector 2 and the harness fixing part (not shown) disposed in the vehicle body side is set to be minimum length. In a case where the sliding door moves from a fully open position to a fully closed position, the operations can be easily reversed, i.e. from FIG. 5 to FIG. 3. In detail, the harness winding section 5 will moves with the wiring harness 14 keeps floating.

In FIG. 5, in cases where the harness winding section 5 is set to have great withdrawal stroke, the inclined portion 14c of the wiring harness 14 can also be arranged straightly with respect to the upper opening 13.

In accordance with the afore-mentioned first embodiment of the present invention, the protector 2 is disposed in left-hand sliding door of the vehicle, and the protective cover 4 is disposed adjacent to the cylinder. However, for example, in cases where the protector 2 is overall reversed (i.e. inside-out), and the protective base 3 is disposed adjacent to the cylinder, the sliding door-fully closed position as shown in FIG. 3 will be reversed to the sliding door-fully open position. Further, the sliding door-fully open position as shown in FIG. 5 will be reversed to the sliding door-fully closed position.

In accordance with the afore-mentioned first embodiment of the present invention, the protector 2 is orientated vertically with respect to the sliding door. In other words, the protector 2 is vertically arranged on the sliding door. However, the protector 2 may be orientated vertically with respect to the vehicle body (i.e. fixed structure) as well as may be orientated horizontally with respect to the sliding door. For reference, Japanese Publication of Patent Application No. 2001-354085 discloses that the protector 2 is orientated horizontally with respect to the sliding door. In this case, when the sliding door partially open as shown in FIG. 4, the wiring harness 7 is leaded into the protector 2 not upwardly but toward the right hand or left hand of the vehicle. In a case where the protector 2 is arranged vertically, it can also be arranged slightly inclinatorily.

In accordance with the afore-mentioned first embodiment of the present invention, the harness winding section 5 is ellipse in shape. However, the shape of the harness winding section 5 is not limited solely to the ellipse, but may be a circle insomuch as the sliding stroke of the sliding pin 17 inside the harness winding section 5 does not become short. It is also possible to form the front half in a circular arc, and the rear half in rectangular shape. In accordance with the afore-mentioned first embodiment of the present invention, the harness winding section 5 is moved back and forth, i.e. in a horizontal direction. However, the harness winding section 5 can also be moved inclinatorily.

In accordance with the afore-mentioned first embodiment of the present invention, the power supply device is applied to the vehicle sliding door. However, the power supply device of the present invention can be applied to, for example, a sliding door other than vehicle sliding door, a sliding door for a device of preparing a product, a sliding door for a survey instrument, and so on. Further, this construction in accordance with the present invention can be employed as not merely a power supply device, but also as a construct for arranging a wiring harness.

In accordance with the afore-mentioned first embodiment of the present invention, since the harness winding section 5 moves back and forth (i.e. horizontally) within the protector 2, a relatively wide space required for a conventional harness winding section can be decreased, and thus the space within the protector can be efficiently utilized as a space allowing for the movement of the wiring harness. In addition, since the spring 6, and sliding devices such as the guide block 15 and the sliding pin 17 are received inside the harness winding section 5, the space inside the protector 2 can be minimized, thus allowing the overall size of the protector 2 to be reduced.

Further, since a conventional flat spring is unnecessary, the inner space of the protector 2 can be decreased. Since the minimum radius of curvature of the flat spring is not needed to be regulated by the harness winding section 5, the harness winding section 5 of the present invention has a diameter smaller than the conventional one, thus allowing the protector 2 to be minimized. Meanwhile, the minimum radius of curvature of the flat spring should be larger than the minimum radius of curvature of the wiring harness 14 for preventing the flat spring from plastic deformation and reduction in its force. Also, a relatively expensive flat spring and a cap member positioned in the front end of the flat spring are also unnecessary, thereby reducing the prepare cost of the power supply device 1. In addition, the harness winding section 5 is not upwardly energized by using the flat spring, but moves the harness winding section 5 in a horizontal direction and thus receiving the extra length of the wiring harness therein. Accordingly, the height of the protector is made to be lower.

FIGS. 6 to 10 show another embodiment of the power supply device in accordance with the present invention. The protector 2 and the wiring harness 14 in this embodiment are the same as those in the afore-mentioned first embodiment of the present invention.

Figure 6:
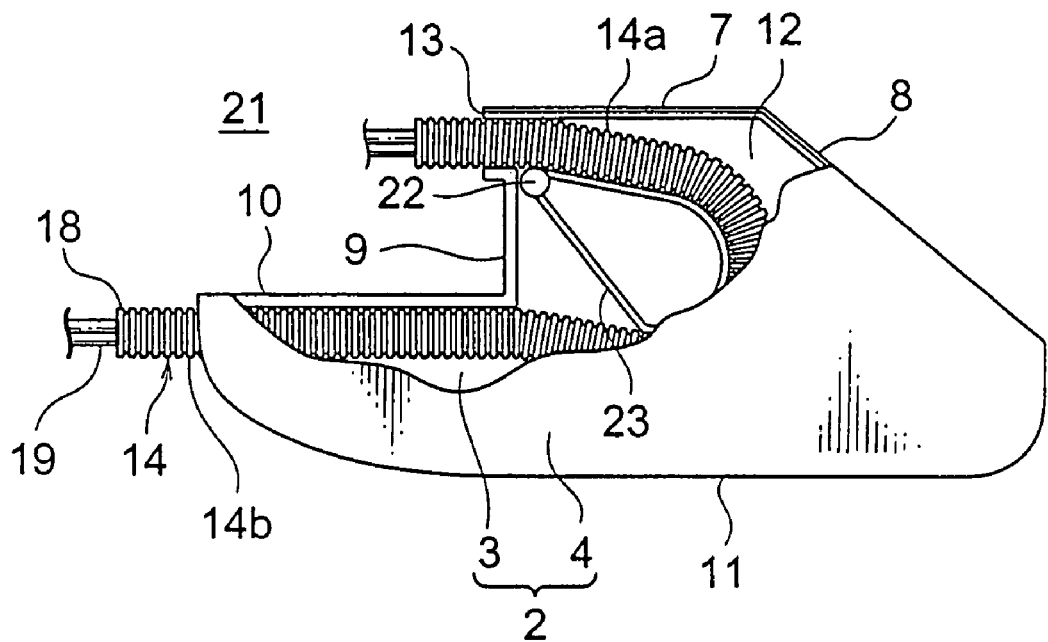
FIG. 6 is a front view of a power supply device in accordance with the second embodiment of the present invention, with partially omitted.

As shown in FIG. 6, the power supply device 21 is vertically disposed on the sliding door of a vehicle (i.e. the power supply device 21 is orientated vertically with respect to the sliding door of a vehicle), and is shown to include a protector 2 (i.e. a case) formed of synthetic resin, a harness winding section 23 which hold its freedom of vertical floating with supported by a bearing portion 22, and a elastic member 24 (shown in FIG. 7) for energizing the harness winding section 23 upwardly.

The protector 2 is shown to include a protective case 3 having a relatively lower height and a protective cover 4. These protective case 3 and protective cover 4 are fixed to each other by an engaging member (now shown). The top wall 7 of the protector 2 is arranged in a flat configuration, and is connected to a relatively long, inclined wall 8 (front side), and also to a relatively short vertical wall 9 (rear side), which is, in turn, connected to a horizontal wall 10. The inclined wall 8 and the horizontal wall 10 are connected to an opening 11 though which an oblong wiring harness extends. Each of peripheral walls 7~10 extends perpendicularly to a substrate 12.

A relatively narrow opening 13 through which a wiring harness extends is provided on top of the vertical wall 9. The upper portion 14a of the wiring harness 14 extends along the top wall 7 and is leaded through the opening 13. The upper portion 14a is fixed to the protector 2 in the vicinity of the opening 13 by means of any fixing member such as belts or tapes, and then is connected to the accessory of a vehicle sliding door side.

Further, a lower portion 14b of the wiring harness 14 extends from an opening 11, and is leaded in the vehicle body side (fixed structure) in a manner that the lower portion 14b can float in its longitudinal direction. The lower portion 14b is connected to the harness fixing portion (not shown) in the vicinity of a foot board of the vehicle body, and is in turn connected to the wiring harness (not shown) of the vehicle body side (i.e. electrical power side) via the harness fixing portion. It is desired to form a curved harness guide surface along the lower opening 11 in the lower end portion of the protective cover 4.

The shape of the protector 2 is not limited to the shape as illustrated in FIG. 6. For example, both the vertical wall 9 and the horizontal wall 10 may constitute an inclined wall, and therefore may be in a symmetrical relationship with the inclined wall 8. Furthermore, it is also possible to form the opening 13, which the upper wiring harness extends through, in the front area and/or in the center of the top wall 7.

Figure 7:
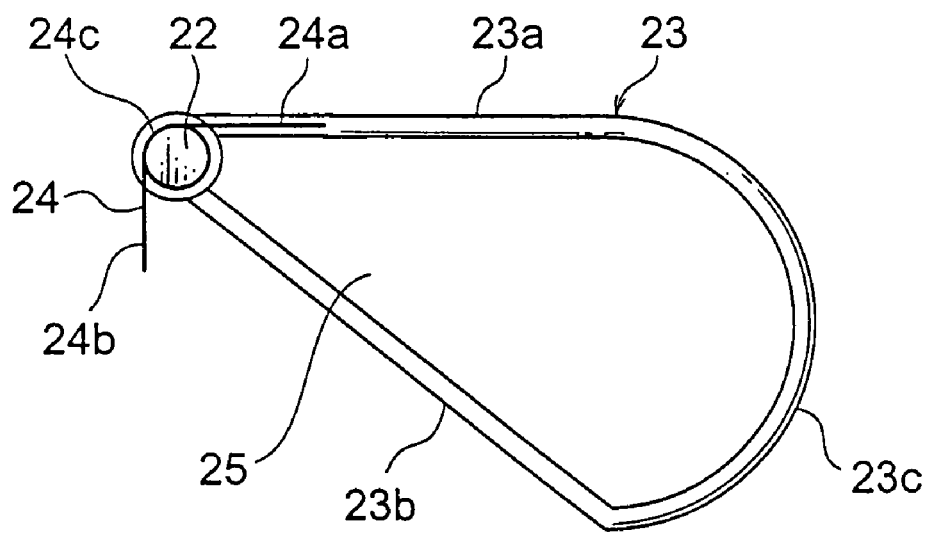
FIG. 7 is a front view of a harness winding section of the power supply device of FIG. 6.

The harness winding section 23 is vertically-slidably arranged between the protective base 3 and the protective cover 4. As shown in FIG. 7, the sector-shaped harness winding section 23 is mainly constituted by continuous circumferential walls, which includes a upper straight wall portion 23a, a lower wall portion 23b downwardly inclined with respect to the upper straight wall portion 23a, and an arc-shaped wall portion 23c connecting one end of the upper straight wall portion 23a and one end of the lower wall portion 23b each other.

A bearing portion 22 is provided in an intersection of the upper wall portion 23a and the lower wall section 23b. A coiling portion 24c of a coil spring 24 is inserted through the bearing 22. One elongated projection of the coil spring 24a is fixed to the upper wall portion 23a, or elastically abuts against a projection of the upper wall portion 23a. On the other hand, another elongated projection of the coil spring 24b elastically abuts against a vertical wall portion 9 of the protector (in FIG. 6) or a projection (not shown). In this way, the harness winding section is energized upwardly. Due to the coil spring 24, the elastic member can be arranged while reducing its overall size.

Replacing the coil spring 24, a compressed coil spring (not shown) or flat spring can be positioned the inner space of the harness winding section 23, and can abut against the inner surface of the upper wall portion 23a by means of a spring-like member, thus energizing the harness winding section 23 upwardly.

As shown in FIG. 6, the synthetic resin-made corrugate tube 18 of the wiring harness 14 is arranged along the exterior surface of the upper wall portion 23a and the exterior surface of the arc-shaped wall portion 23c of the harness winding section 23, with bent in U-shape. The upper portion 14a and the lower portion 14b of the wiring harness 14 are arranged in substantially parallel with each other. The lower portion 14b extends along the horizontal wall 10 of the protector 2 and also extends rearward through the rear end of the opening 11.

The wiring harness 14 is shown to include the corrugate tube 18 and a plurality of the insulated electrical wires 19 passing through the corrugate tube 18. Replacing the corrugate tube 18 as the wiring harness, a plurality of the electrical wires 19 may be bound by means of tapes, belt and so on. The corrugate tube can be substituted by protective tubes such as mesh tubes.

Figure 8:
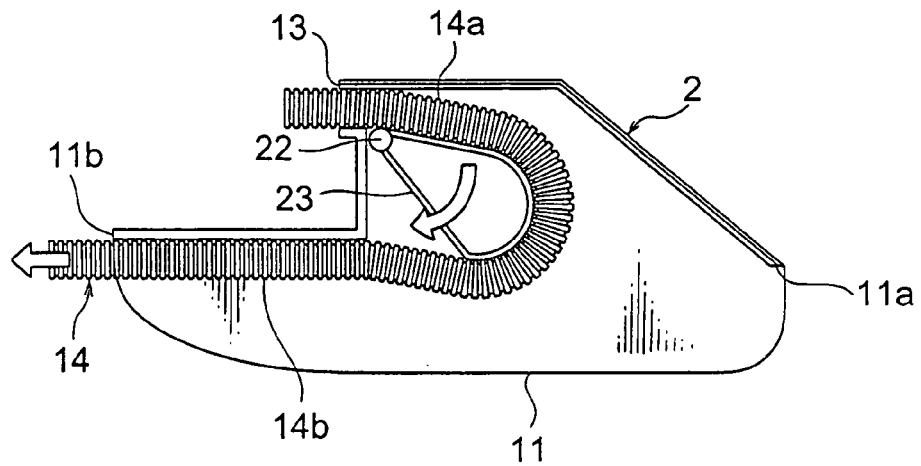
FIG. 8 is a front view of the power supply device of FIG. 6, with a sliding door fully closed.
Figure 9:
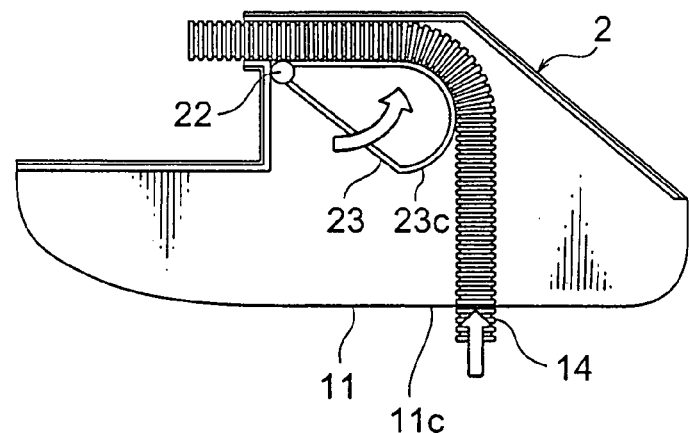
FIG. 9 is a front view of the power supply device of FIG. 6, with the sliding door partially open.
Figure 10:
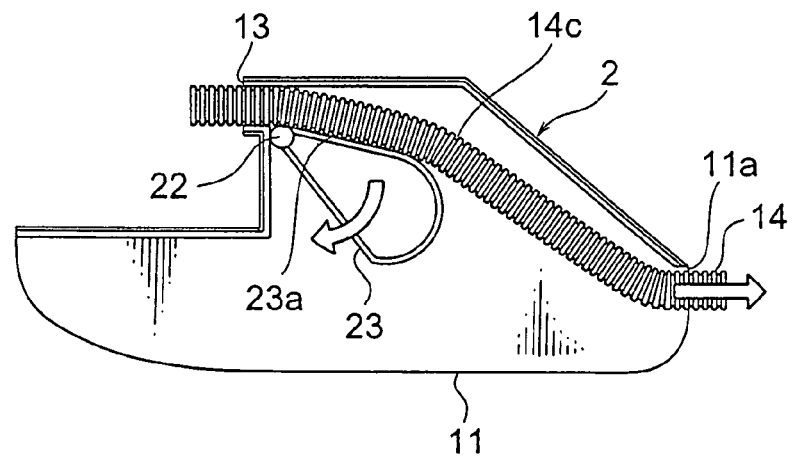
FIG. 10 is a front view of the power supply device of FIG. 6, with the sliding door fully open.
Figure 11:
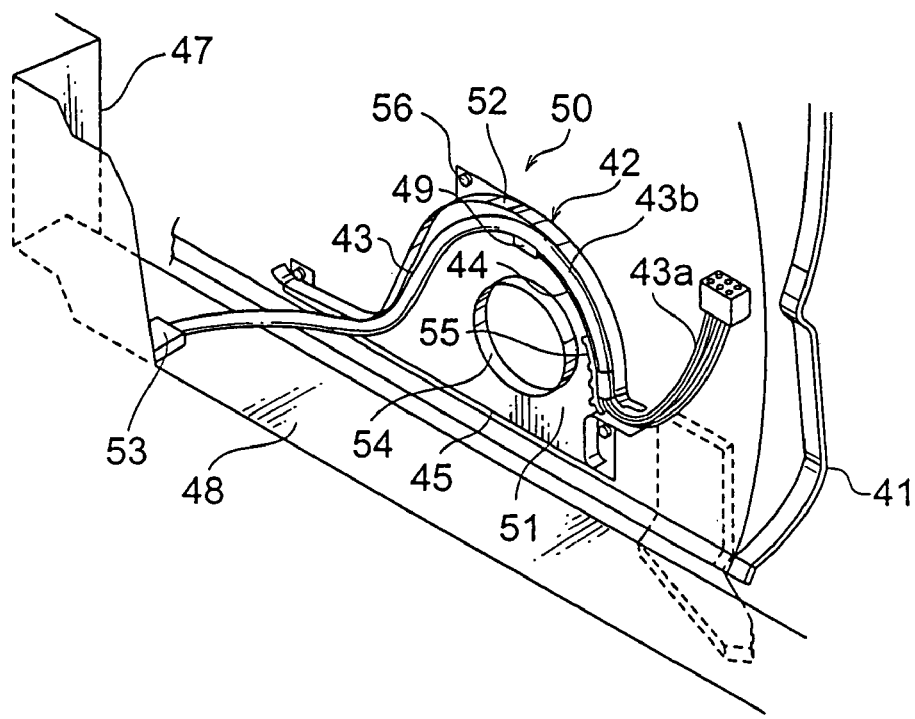
FIG. 11 is a perspective view of a conventional power supply device, with a sliding door fully closed.
Figure 12:
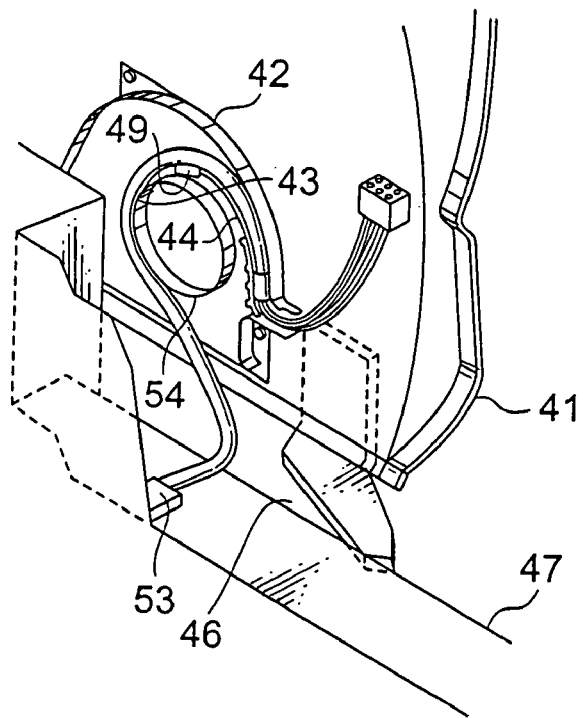
FIG. 12 is a perspective view of the conventional power supply device of FIG. 11, immediately before the sliding door fully open.

FIGS. 6 and 8 also show the power supply device with a sliding door fully closed. FIGS. 8 to 10 show the inside of the protector, with the protective cover 4 omitted.

As shown in FIG. 8, in a case where the sliding door is closed (i.e. when the sliding door moves together with the protector 2 toward the front side of the vehicle and thereby being closed), the upper portion 14a of the wiring harness 14 is fixed to the protector 2 in the area of the opening 13. In this case, while the lower portion 14b of the wiring harness 14 is drawn from the rear end 11b of the opening 11 toward the vehicle body side, the harness winding section 23 moves downward against the force of the energized spring 24 with supported by the bearing 22, as indicated by the arrow in FIG. 7. Therefore, due to this force of the energized spring 24 exerted oppositely to the direction as indicated by the arrow, the wiring harness 14 can successfully maintain its approximate "U" shape.

In a case where the sliding door moves rearward together with the protector 2 from a closed position as shown in FIG. 8 to an open position over a vehicle opening, the lower portion 14 of the wiring harness 14 keeps floating toward the front side of the vehicle along the lower opening 11. In the case of the sliding door being partially open as shown in FIG. 9, the wiring harness 14 is inclined to unroll in the position of 11c and then to hang down in the space between the protector 2 and the vehicle body. However, since the harness winding section 23 is moved upward with respect to the bearing 22 by the spring, as indicated by the arrow, the wiring harness 14 is lifted upward along the curved surface of the arc-shaped wall portion 23c of the harness winding section 23, and then is leaded into the protector 2, thus allowing the extra length of the wiring harness 14 to be received in the protector 2.

In a case where the sliding door moves rearward together with the protector 2 from a partially open position as shown in FIG. 9, the wiring harness 14 keeps floating toward the front side of the vehicle along the lower opening 11. In the case of the sliding door being fully open, the wiring harness 14 is drawn from the front end portion 11a of the opening 11 toward the vehicle body side. The harness winding section 23 is pressed against the inclined section 14c of the wiring harness 14, and therefore moves downward with respect to the bearing 22 against the energized spring, as indicated by the arrow. The inclined section 14c of the wiring harness 14 is elastically energized in the area of the upper wall portion 23a of the harness winding section 23, thus straightly maintaining its high tension.

In the case of the sliding door being fully open, the length of the wiring harness 14 between the protector 2 and the harness fixing part (not shown) disposed in the vehicle body side is set to be minimum length. In a case where the sliding door moves from a fully open position to a fully closed position, the operations can be easily reversed, i.e. from FIGS. 10 to FIG. 8. In detail, the harness winding section 23 will moves with the wiring harness 14 keeping floating.

In FIG. 10, in cases where the harness winding section 23 is set to have great downward stroke, the inclined portion 14c of the wiring harness 14 can also be arranged straightly with respect to the upper opening 13.

In accordance with the afore-mentioned second embodiment of the present invention, the protector 2 is disposed in left-hand sliding door of the vehicle, and the protective cover 4 is disposed adjacent to the cylinder. However, for example, in cases where the protector 2 is overall reversed (i.e. inside-out), and the protective base 3 is disposed adjacent to the cylinder, the sliding door-fully closed position as shown in FIG. 8 will be reversed to the sliding door-fully open position. Further, the sliding door-fully open position as shown in FIG. 10 will be reversed to the sliding door-fully closed position.

In accordance with the afore-mentioned second embodiment of the present invention, the protector 2 is orientated vertically with respect to the sliding door. In other words, the protector 2 is vertically arranged on the sliding door. However, the protector 2 may be orientated vertically with respect to the vehicle body, as well as, may be orientated horizontally with respect to the sliding door. For reference, Japanese Publication of Patent Application No. 2001-354085 discloses that the protector 2 is orientated horizontally with respect to the sliding door. In this case, when the sliding door partially open as shown in FIG. 9, the wiring harness 14 will be leaded into the protector 2 not upwardly but toward the right hand or left hand of the vehicle. In a case where the protector 2 is arranged vertically, it can also be arranged slightly inclinatorily.

In accordance with the afore-mentioned second embodiment of the present invention, there is provided a sector-shaped harness winding section 23. However, for example, the lower wall portion 23b can be omitted. In this case, the upper wall portion 23a and the arc-shaped wall portion 23c thus form a approximate "J" shape.

In accordance with the afore-mentioned second embodiment of the present invention, the power supply device is applied to the vehicle sliding door. However, the power supply device of the present invention can be applied to, for example, a sliding door other than vehicle sliding door, a sliding door for a device of preparing a product, a sliding door for a survey instrument, and so on. Further, this construction in accordance with the present invention can be employed as not merely a power supply device, but also as a construct for arranging a wiring harness.

In accordance with the afore-mentioned second embodiment of the present invention, since the harness winding section 23 moves upward ad downward (i.e. vertically) within the protector 2, a relatively wide space required for a conventional harness winding section can be decreased, and thus the space within the protector can be efficiently utilized as a space allowing for the movement of the wiring harness.

Further, since a conventional flat spring is unnecessary, the inner space of the protector 2 can be decreased. Since the minimum radius of curvature of the flat spring is not needed to be regulated by the harness winding section 5, the harness winding section 23 of the present invention has a diameter smaller than the conventional one, thus allowing the protector 2 to be minimized. Meanwhile, the minimum radius of curvature of the flat spring should be larger than the minimum radius of curvature of the wiring harness 14 for preventing the flat spring from plastic deformation and reduction in its force. Also, a relatively expensive flat spring and a cap member positioned in the front end of the flat spring are also unnecessary, thereby reducing the prepare cost of the power supply device 21.

Further, by setting the rotating angle of the harness winding section 23 in wider range, the extra length of the wiring harness 14 can be easily increased, thereby easily coping with the increased amount of sliding of the sliding door.

Hereinafter, there will be illustrated several advantageous effects in accordance with the present invention.

As mentioned previously, according to one aspect of the present invention, there is provided a power supply device comprising a protector for receiving a wiring harness and extending the floating wiring harness through an elongated opening therein, a harness winding section free to bend the wiring harness to regulate a minimum radius of curvature of the wiring harness while holding its freedom of movement within the protector, and an elastic member for energizing the harness winding section to lead the wiring harness into the protector. First of all, since the harness winding section configured to regulate the radius of curvature of the wiring harness moves within the protector, the space within the protector can be efficiently utilized as a space allowing for the movement of the wiring harness. Secondly, in this power supply device, a relatively expensive flat spring and a cap member positioned in the front end of the flat spring are unnecessary, thereby reducing the prepare cost of the power supply device. Thirdly, in this power supply device, since the minimum radius of curvature of the flat spring is not needed to be regulated by the harness winding section, the harness winding section of the present invention has a diameter smaller than the conventional one, thus allowing the protector to be minimized.

Further, according to another aspect of the present invention, the harness winding section is moved in one direction against the energized elastic member in an end area of the elongated opening, and the harness winding section energized by the elastic member is moved in the other direction in the center area of the elongated opening. In this power supply device, the harness winding section is moved in one direction when is drawn, and therefore the length of the wiring harness to be drawn can be cut. As a result, the preparing cost of the wiring harness can be reduced. Moreover, since the harness winding section energized by the elastic member is moved in the other direction, the extra length of the wiring harness can be securely and smoothly leaded into the protector.

Further, according to yet another aspect of the present invention, the elastic member is received inside the harness winding section. In this power supply device, since the inner space of the harness winding section is efficiently utilized as a section for receiving the elastic member therein, thereby reducing the inner space of the protector, i.e. the protector size.

Changes and modifications in the specifically described embodiments would come within the scope of the invention, which is intended to be limited only by the scope of the appended claims, as interpreted according to the principles of patent law.

What is claimed is:

1. A power supply device, comprising: a protector for receiving a floating wiring harness and extending the floating wiring harness through an elongated opening therein; a harness winding section free to bend the wiring harness to regulate a minimum radius of curvature of the wiring harness while holding its freedom of movement within the protector; and an elastic member for energizing the harness winding section to lead the wiring harness into the protector, wherein in an end area of the elongated opening, the harness winding section is moved in one direction against the energized elastic member, and in the center area of the elongated opening, the harness winding section energized by the elastic member is moved in the other direction.

2. The power supply device according to claim 1, wherein the elastic member is received inside the harness winding section.

* * * * *

UNITED STATES PATENT AND TRADEMARK OFFICE
Certificate

Patent No. 7,557,299 B2

Patented: July 7, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hisashi Takemoto, Shizuoka (JP); Naoto Kogure, Shizuoka (JP); Tomoaki Nishimura, Kariya (JP); and Motonari Inagaki, Kariya (JP).

Signed and Sealed this Fourteenth Day of August 2012.

JINHEE LEE
*Supervisory Patent Examiner*
Art Unit 2833
Technology Center 2800